United States Patent [19]
Johnson

[11] 3,788,605
[45] Jan. 29, 1974

[54] HYDRAULIC AUTO WINCH

[76] Inventor: George Verne Johnson, 5510 S. W. Buddington, Portland, Oreg. 97219

[22] Filed: Feb. 16, 1972

[21] Appl. No.: 226,736

Related U.S. Application Data

[63] Continuation of Ser. No. 52,173, July 6, 1970, abandoned.

[52] U.S. Cl............................ 254/150 FH, 254/166
[51] Int. Cl............................................. B66d 3/18
[58] Field of Search.......... 254/150 FH, 166, 186 R; 242/86.2, 86.5

[56] References Cited
UNITED STATES PATENTS

| | | | |
|---|---|---|---|
| 3,150,842 | 9/1964 | Weber | 242/86.5 |
| 2,289,387 | 7/1942 | Stephens | 254/150 FH X |

Primary Examiner—Evon C. Blunk
Assistant Examiner—James L. Rowland
Attorney, Agent, or Firm—Lee R. Schermerhorn

[57] ABSTRACT

The winch drum is mounted on the shaft of a hydraulic motor which is contained within the drum. One end of the motor protrudes from an end of the drum and is supported in cantilever fashion by a bracket which may be mounted on an automobile in a variety of different positions as, for example, on a bumper. This mounting arrangement leaves one end of the drum unobstructed to loop on a few turns of cable for alternative capstan type operation. The motor may be operated by fluid pressure from the power steering pump of an automobile or from a hydraulic pressure system on a boat.

1 Claim, 7 Drawing Figures

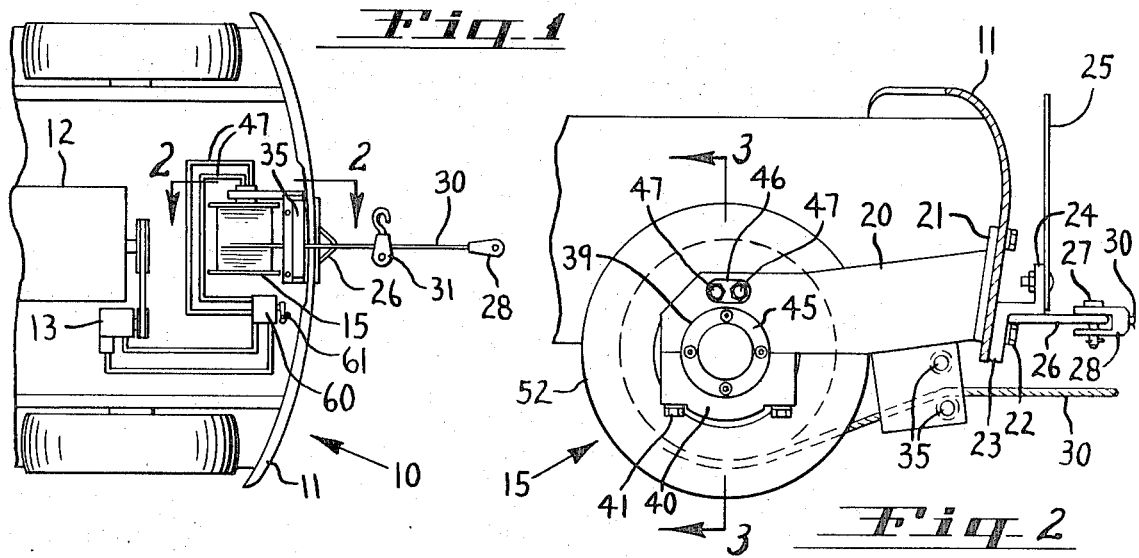
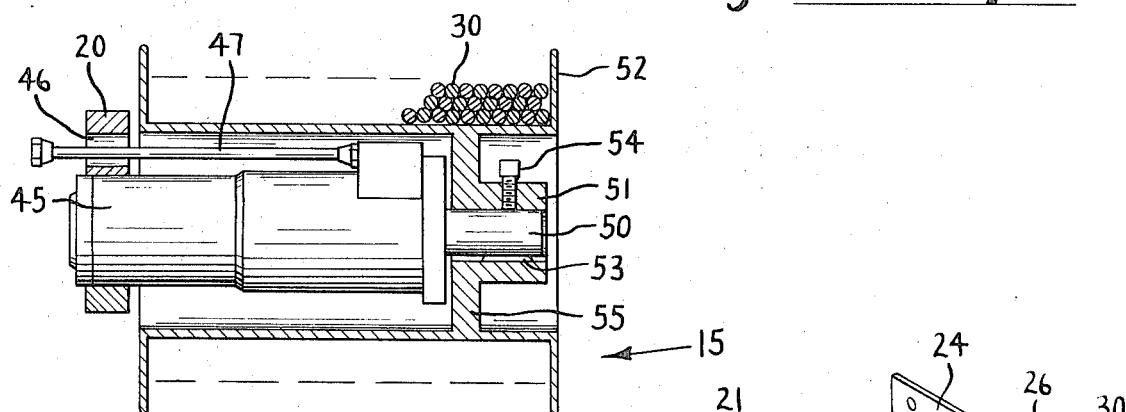
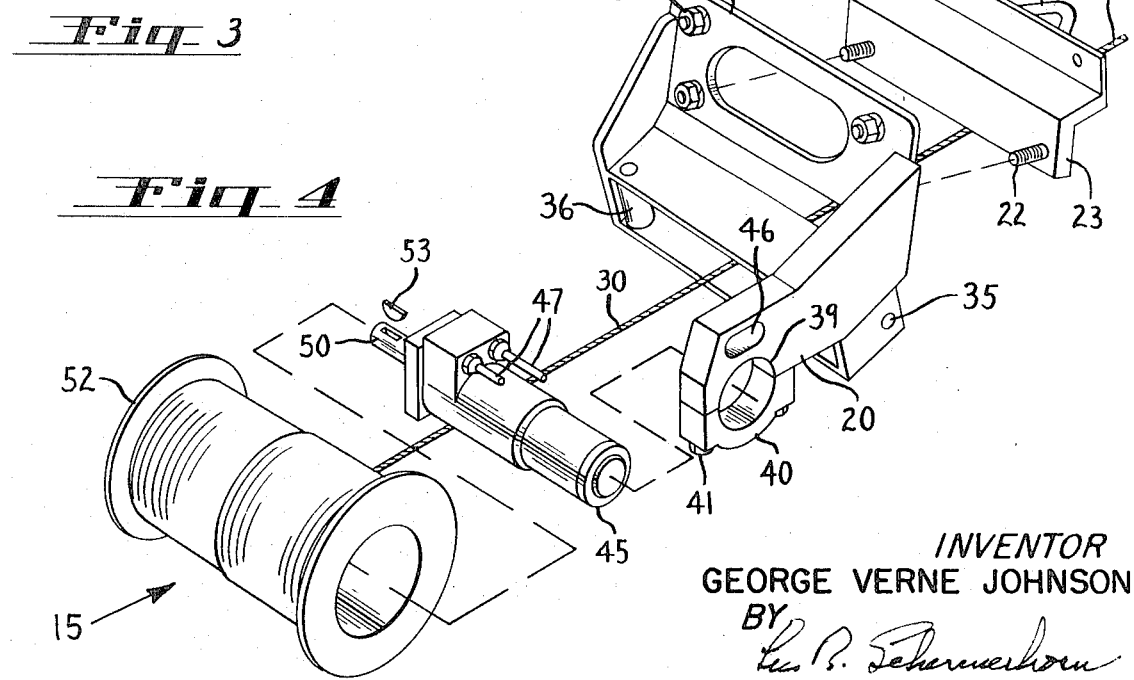

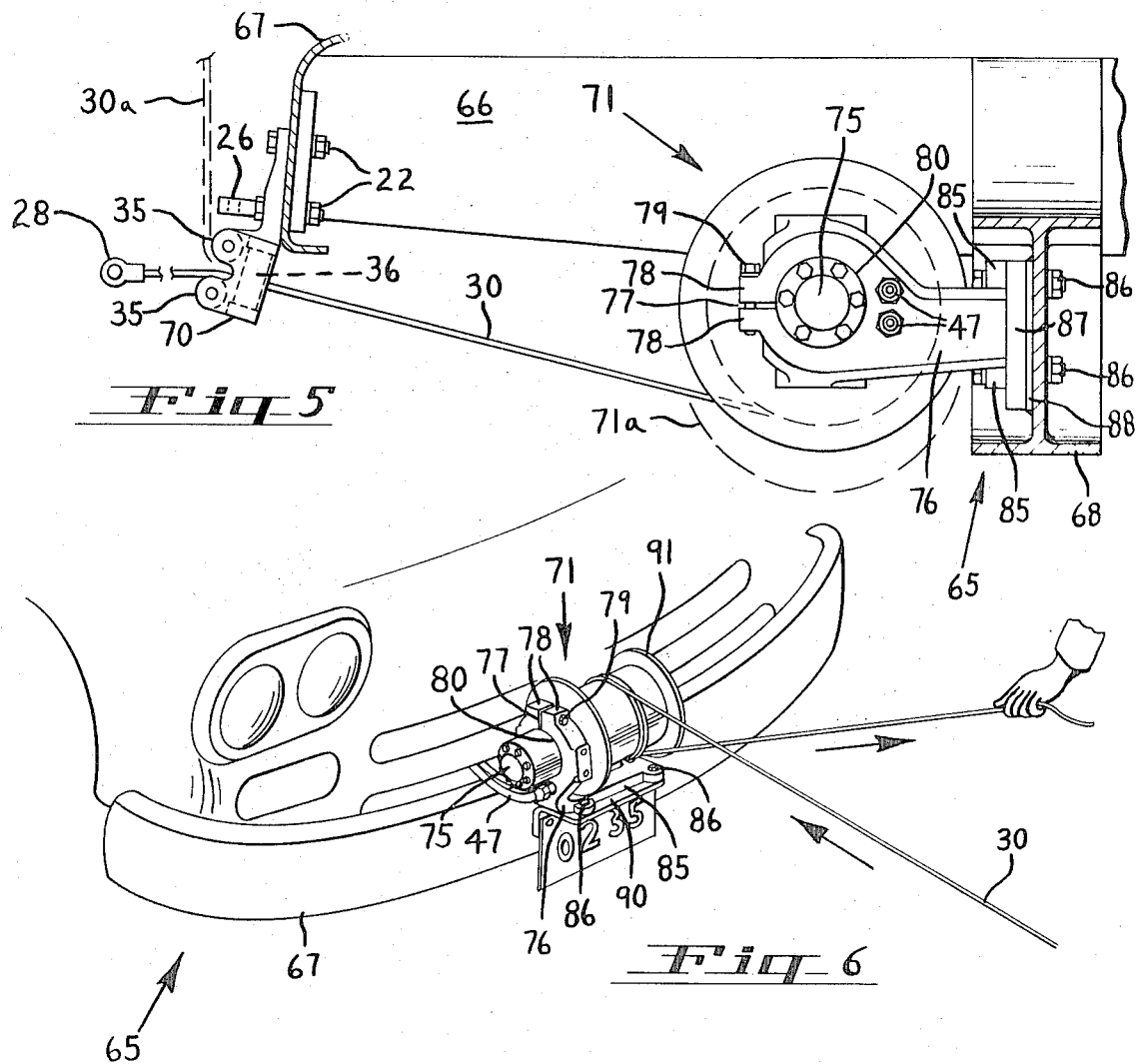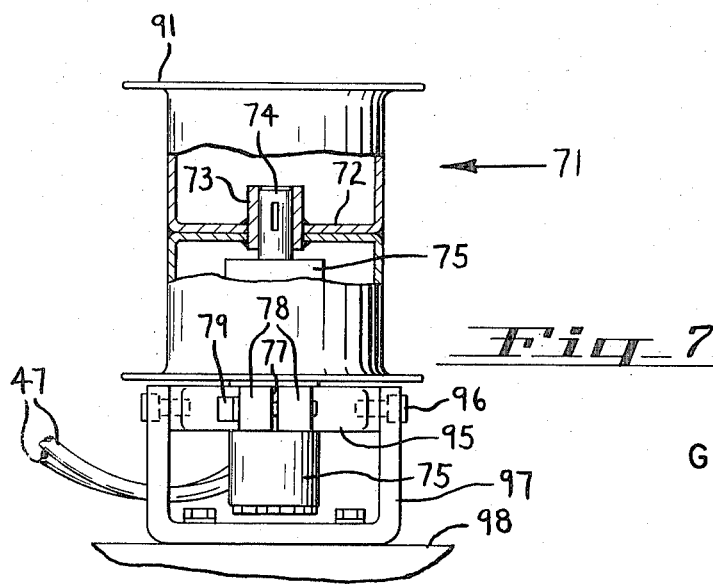

HYDRAULIC AUTO WINCH

CROSS-REFERENCES TO RELATED APPLICATIONS

This application is a continuation of U.S. Pat. Ser. No. 52,173, now abandoned, filed July 6, 1970.

BACKGROUND OF THE INVENTION

This invention relates to a hydraulic winch particularly for automobiles and boats.

Auto winches have heretofore been driven by electric motors energized from the auto battery. The limited capacity of an auto battery, even in new condition, seriously restricts the usefulness of such a winch, and, if the battery is not in new condition and well charged, the power demands of the winch will quickly exhaust the battery.

Also, electric winches are quite complicated and expensive, as they require some type of reduction gearing, a brake, and a complicated and rather delicate control system involving various switches and relays and the like. The size of this equipment requires the winch to be mounted in front of the bumper or above the bumper, making an unsightly accessory on the auto and leaving the winch exposed to damage. A conventional bumper installation mounting on an auto does not provide sufficient space behind the bumper for an electric winch with its large motor and reduction gearing. If it is desired to install such a winch behind the bumper, the bumper brackets must be extended to space the bumper farther than normal away from the car.

Objects of the invention are, therefore, to provide an improved auto winch, to provide a winch which may be used as a capstan on an automobile or boat, to provide an auto winch driven by a hydraulic motor operated from the power steering pump of the auto, to provide a compact winch assembly which may be unobtrusively installed in a protected position behind an auto bumper without altering the factory bumper mounting, to provide a winch which is adapted for convenient application to a conventional type of compact, low speed, high torque, reversible oil motor, and to provide a rugged and durable winch of the type described which is of relatively simple and inexpensive construction having relatively few parts to manufacture and maintain in good operating condition.

SUMMARY OF THE INVENTION

In the present construction the winch drum is mounted on a shaft extending from one end of a hydraulic motor. The opposite end of the motor housing projects from the opposite end of the drum for cantilever support by a bumper bracket or other supporting bracket. The motor and drum assembly are so compact, with the motor contained within the drum, that it is possible to mount the unit in available space behind a conventional bumper without altering the bumper. The cantilever mounting of the motor and drum leaves one end of the drum unobstructed for use as a capstan if desired.

The hydraulic motor is operated from the power steering pump of an auto. This is feasible because during winch operation little or no steering function is ordinarily required. The winch may be operated for an indefinite period of time as long as there is fuel to run the auto engine. The winch motor operates in the normal pressure range of a conventional power steering pump and does not overload or damage the pump. The winch is also adapted for use on a boat.

The invention will be better understood and additional objects and advantages will become apparent from the following detailed description of the preferred embodiments illustrated on the accompanying drawings. Various changes may be made in the details of construction and arrangement of parts and certain features may be used without others. All such modifications within the scope of the appended claims are included in the invention.

BRIEF DESCRIPTION OF THE DRAWINGS

FIG. 1 is a schematic bottom plan view of the front end of an automobile equipped with a winch embodying the principles of the invention;

FIG. 2 is an enlarged view on the line 2—2 in FIG. 1;

FIG. 3 is a view on the line 3—3 in FIG. 2;

FIG. 4 is an exploded view in perspective of the winch and its mounting bracket;

FIG. 5 is a view similar to FIG. 2, showing a modification;

FIG. 6 is a fragmentary perspective view showing the winch of FIG. 5 mounted on a bumper for operation as a capstan; and FIG. 7 is a side elevation view, with parts broken away, showing the winch mounted as a vertical capstan.

DESCRIPTION OF THE PREFERRED EMBODIMENTS

In FIG. 1 the automobile 10 has a conventional front bumper 11, engine 12 and power steering pump 13. A winch 15 embodying the invention is mounted on front bumper 11, although it is to be understood that the winch may be mounted on the rear bumper or elsewhere on the auto, if desired.

Winch 15 is supported by a single bracket arm 20 mounted on the rear of bumper 11. Bracket arm 20 is welded to a support plate 21 which receives upper and lower bolts 22 passing through the bumper. The lower bolts 22 secure a clamp plate 23 on the front of the bumper. Clamp plate 23 has an upstanding flange 24 for mounting the license plate 25. Parts 20 and 21 together may be considered as an L-shaped bracket, the plate 21 being generally parallel with the axis of the winch drum.

Clamp plate 23 is also equipped with an eye 26 to receive a pin 27 and clevis 28 on the free end of wire rope 30. By connecting clevis 28 with eye 26 as shown in FIG. 2, the load may be connected to a pulley block 31 at a bight in the rope for operating the winch with a two-part line. Additional pulley blocks may be employed to provide a three-part line or four-part line when greater mechanical advantage is desired. The winch may be operated with a one-part line by connecting the load to clevis 28 without using the eye 26 and pulley block 31, as shown in FIG. 1.

Bracket unit 20, 21 is equipped with a pair of horizontal fair lead rollers 35 and a pair of vertical fair-lead rollers 36 which form a rope guide under the lower edge of the bumper. The rear end of bracket arm 20 contains a semi-cylindrical recess 39 to cooperate with a complementary semi-cylindrical clamp 40 secured to the arm by cap screws 41. Clamp 40 secures and provides cantilever support for a cylindrical end of hydraulic motor housing 45. Immediately above recess 39 the arm 20 has an opening 46 for a pair of hydraulic lines 47 connected with the motor.

Motor shaft 50 projects from the opposite end of motor housing 45 and is connected closely adjacent said opposite end of motor housing 45 with a hub 51 in the corresponding end of winch drum 52. Thus, one end of motor housing 45 has cantilever support in bracket arm 20 and the opposite end of winch drum 52 has cantilever support on motor shaft 50 with the motor housing contained within the drum as shown in FIG. 3. This leaves the hub end of the drum unobstructed for looping a few turns of the rope around the drum when it is desired to use the drum as a capstan.

In such use the rope is not anchored to the drum as shown in FIG. 3; the operator tensions a free end of the rope to effect frictional engagement between the rope and drum when traction is desired. When the operator relaxes tension on the free end of the rope, the drum rotates within the several turns of rope without exerting traction on the rope. The tractive effort on the rope may be controlled by varying the amount of manual tension applied to the free end of the rope, causing the drum to slip within the lightly tensioned loops of rope.

Hub 51 is secured to shaft 50 by suitable means such as key 53 and setscrew 54. Preferably, the hub is connected to drum 52 by a radial web 55 a short distance from the end of the drum to reduce the length of the cantilever arm between web 55 and the opposite end of the drum. This allows a considerable number of turns of the rope to lay to the right of web 55 in FIG. 3 and still permits the motor to be contained within the drum.

The winch is controlled by a valve 60 connected between steering pump 13 and the hydraulic connections 47 to the motor. Valve 60 has an operating lever 61 which is accessible above the bumper and in front of the auto radiator. Placing the valve lever in one limit position connects pump pressure to one line 47 and connects the other line 47 to the suction side of the pump for rotation of drum 52 in one direction. Shifting lever 61 to its opposite limit position connects the one line 47 to suction and the other to pump pressure for rotation of drum 52 in the opposite direction.

Placing lever 61 in mid position closes both lines 47 at the valve, preventing circulation of hydraulic fluid through the motor. This operates as a brake on the winch, making a friction brake unnecessary. The motor is a displacement type such as a vane or gear type which is hydraulically locked, or at least effectively retarded, by stopping the fluid flow. When the two lines 47 are both closed at valve 60, the pump 13 discharges through a built-in relief valve as in normal operation of the vehicle when there are no steering movements. If desired, the valve lever 61 may also be manipulated by a cable control extending to the instrument panel of the auto.

Motor 45 is a conventional type of compact, low speed, high torque, reversible oil motor available on the market. These characteristics make it practical to drive the winch drum directly without reduction gearing and the hydraulic pressure available from a conventional power steering pump is sufficient to produce the desired torque in a motor small enough to be contained within a winch drum of suitable diameter for a size of rope 30 which will withstand the maximum tension developed by the motor. When an excessive length of rope is needed, the winch may be operated as a capstan as above described.

The present winch may be mounted with equal facility on the rear bumper of an auto for pulling a boat out of water and onto a boat trailer or for other purposes. The winch will operate under water or mud. In either front or rear end locations, the conventional bumper mountings on most autos provide sufficient available space behind the bumper to accommodate the winch without altering the bumper mounting. Thus mounted in protected position, the winch assembly is substantially entirely out of sight and does not project outward or upward from the bumper to detract from the appearance of the auto. The loading on the winch and the duration of its operation are not dependent on the capacity or condition of the auto battery and the winch does not impose an electrical load on the battery which in the case of conventional winches shortens the life of the battery.

The hydraulic power requirements of the winch motor are entirely within the normal capabilities of standard power steering pumps whereby the winch cannot damage the pump. The normal power steering function of the auto is not impaired because steering requirements are minimal when the winch is in operation. Ordinarily, the vehicle is standing still while the winch is operating.

FIGS. 5 to 7 show a modification omitting the fairlead as a part of the winch. In FIG. 5, automobile 65 has a pair of longitudinal frame members 66 which are interconnected by a front bumper 67 and a transverse frame member 68. A separate fair-lead 70 having a pair of horizontal rollers 35 and a pair of vertical rollers 36 is mounted on the front of the bumper by means of bolts 22. Winch drum 71 is mounted on transverse frame member 68.

As shown in FIG. 7, winch drum 71 is supported by an internal web 72 welded on a hub 73 which is pressed and keyed on the shaft 74 extending from one end of hydraulic motor 75, hub 73 being closely adjacent said end of motor 75. The drum comprises a pair of bell-shaped members welded together back to back with their abutting end walls forming the web 72. Hydraulic lines 47 extend between the drum and motor as shown in FIG. 3.

In FIGS. 5 and 6, the motor housing is clamped by a one-piece supporting bracket arm 76. The end of the bracket arm is split at 77 between two bosses 78 which receive a clamping screw 79. The wall of a cylindrical opening 80 in the bracket arm securely grips the cylindrical motor housing when screw 79 is tightened. These parts form a split collar clamp.

As best seen in FIG. 6, the bracket arm 76 is of L-shaped having a portion 85 extending parallel with the axis of the drum. Wide portions of the arm 85 which receive four bolts 86 are visible in FIG. 5. Still referring to FIG. 5, bolts 86 extend through arm 85, a mounting plate 87 and the vertical web of frame member 68. Plate 87 serves as a strengthening member for the vertical web of frame member 68 and is welded at 88 to the web after the holes for bolts 86 have been drilled in the web. It will be observed that bolts 86 are located closer to the upper edge of the plate than to its lower edge. Thus, by turning plate 87 around to reverse the positions of its upper and lower edges, the winch may be lowered to its broken line position at 71a, if desired. This provides vertical adjustment in installing the winch. It will also be observed that bracket arm 76 is offset below the axis of the winch. Thus, additional vertical adjustment may be obtained by turning the winch over so as to place bracket arm 76 on the far end of the winch drum instead of the near end. This will lower the winch drum an additional increment.

By mounting fair-lead 70 on the front of the bumper, the line 30 may extend in a vertical direction from the upper fair-lead roller 35 as shown in broken lines at 30a, if desired. This position of the line would be of advantage, for example, in lifting the front end of the vehicle. Eye 26 provides for using a two or more part line for additional mechanical advantage as described in connection with FIG. 2.

In FIG. 6 the winch 71 is mounted by bolts 86 on a bracket 90 on the front of the bumper 67. This mounting arrangement is convenient in using the winch drum as a capstan, without the fair-lead 70. The end 91 of the drum being free and unobstructed, the operator may loop a few turns of the line 30 over this end of the drum and then tighten the turns of cable on the drum by hand, as shown, to control the movement of the cable in the directions of the arrows. This capstan-type of operation makes it possible to use a line which is too long to be contained on the drum with one end anchored to the drum in normal manner.

FIG. 7 shows how the winch may be mounted in vertical position for use as a capstan on fishing and other small boats where hydraulic power is available to operate the motor 75. In this case the bracket 95 is simply a split ring clamp having a clamp screw 79 to clamp the motor casing as described in connection with FIG. 5 and having two opposite flat sides to receive cap screws 96 in the ends of a U-shaped support bracket 97. Bracket 97 may be mounted on any suitable part of the boat structure as indicated at 98. A similar mounting arrangement may be employed on an automobile, if desired, using the steering pump 13 and control valve 60 in FIG. 1.

Having now described my invention and in what manner the same may be used, what I claim as new and desire to protect by Letters Patent is:

1. A winch comprising a hydraulic motor having an elongated casing, an axial drive shaft extending from one end of said casing, a winch drum surrounding said one end of said casing and having a hub mounted on said drive shaft closely adjacent said one end of said casing, said hub providing the sole support for said drum, the opposite end of said motor casing projecting from one end of said drum, an L-shaped supporting bracket having a base portion parallel with and alongside said drum and an arm portion radial to said casing and drum, said arm portion having an opening receiving said opposite end of said motor casing, a pair of bosses on the end of said arm receiving a clamp screw, said arm being split between said bosses from said one end of the arm to said opening forming a split collar clamp whereby said clamp screw clamps said motor casing in said opening to support said motor and winch drum, hydraulic lines extending from said motor between said casing and drum, and openings in said arm for said hydraulic lines, the opposite end of said drum being unobstructed to receive loops of rope for operation as a capstan.

* * * * *